United States Patent [19]

Wilson

[11] 3,747,716
[45] July 24, 1973

[54] PLATFORM FOR PIT WEIGHING DEVICE
[75] Inventor: Alexander John Wilson, Sutton Coldfield, England
[73] Assignee: Girling Limited, Birmingham, England
[22] Filed: June 26, 1972
[21] Appl. No.: 266,496

[52] U.S. Cl. .............................................. 177/134
[51] Int. Cl. ........................................... G01g 19/02
[58] Field of Search ............ 177/134, 135, 256–258, 177/DIG. 9

[56] References Cited
UNITED STATES PATENTS
| 856,248 | 6/1907 | Gilbert | 177/134 |
| 1,436,769 | 11/1922 | Magrady | 177/134 X |
| 1,627,702 | 5/1927 | Hem | 177/134 X |
| 3,447,618 | 6/1969 | Murphy | 177/256 X |

FOREIGN PATENTS OR APPLICATIONS
| 589,705 | 12/1959 | Canada | 177/258 |

Primary Examiner—George H. Miller, Jr.
Attorney—Samuel Scrivener, Jr. et al.

[57] ABSTRACT

The supports of a weighbridge are box-section girders, two of which extend end-to-end along each of two opposite sides of a weighbridge pit. These girders are joined by a spider which can flex and thus transmits a proportion of the weight on the girders to a single central load cell. Adjustment can be provided in the form of nuts on threaded rods. The girders are preferably mounted so that a well defined hinge line is provided by flexure of a single face of each girder by which the girder is joined to mounting means therefor.

9 Claims, 4 Drawing Figures

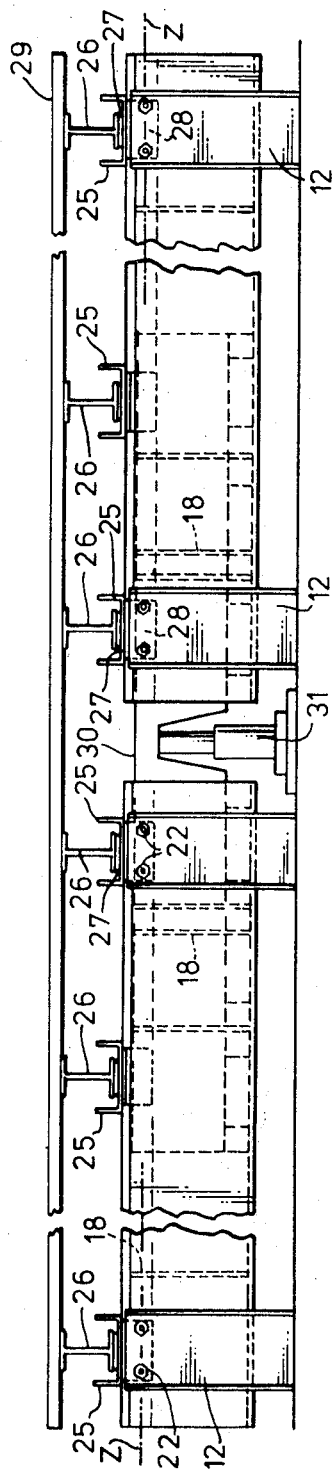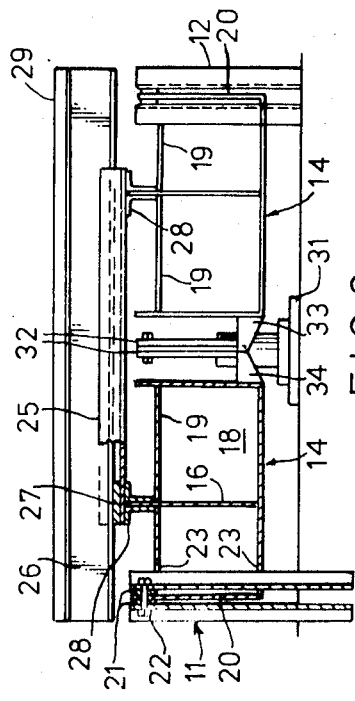

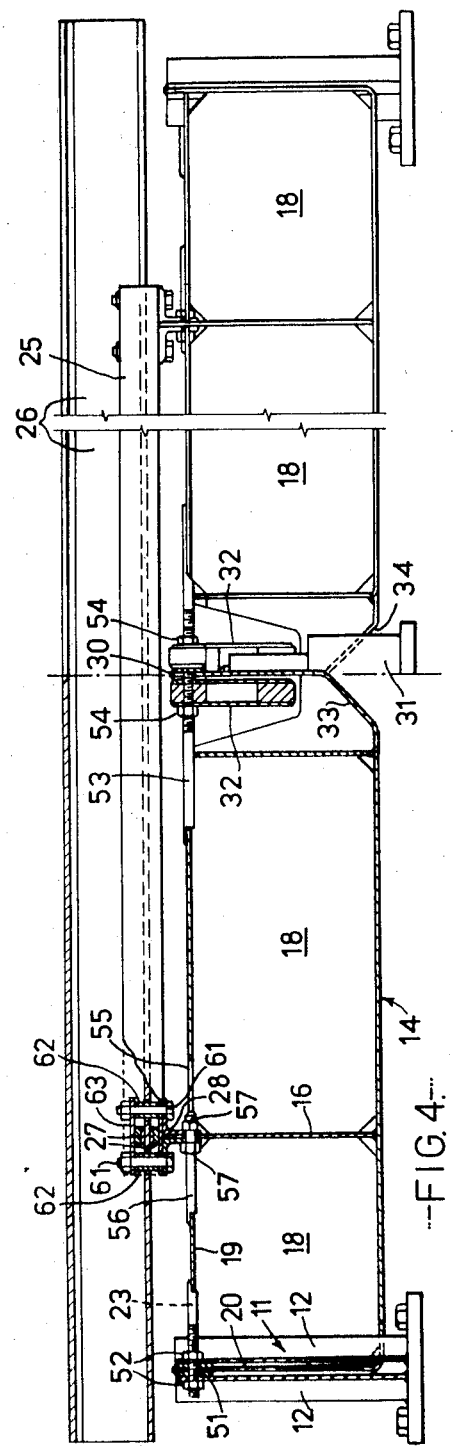

PLATFORM FOR PIT WEIGHING DEVICE

The present invention relates to weighbridges for vehicles.

A weighbridge has a platform on which the vehicle is parked during weighing. The load on this platform is sensed either by a single load cell or by a plurality of load cells. The second type is expensive due not only to the use of the plurality of load cells but also to the complex electronic circuits necessary to balance the outputs of the load cells. These weighbridges require electronically trained repair men. It is therefore with the first type that the invention is concerned.

When using a single load cell, a mechanical device has to be used to transmit to the load cell a deflection or force representing the summation of a plurality of other forces. It is obvious that the platform could not be balanced on a single point and for stability something approximating to at least three-point support is needed. Each point of support takes some load which cannot be neglected in the final indication of the total load.

In most prior constructions, a system of pivotal links has been used to transmit mechanical signals representing the deflections of the various points of support to the load cell. There has been a proposal wherein the platform and its supporting structure are in the form of a flattened tube. One of the flat faces serves as the platform and this is supported along the edges of the flattened tube. These edges hinge and the amount through which they hinge is transmitted to the single load cell.

According to the present invention, there is provided a weighbridge using a single load cell with a load-supporting structure which is in turn supported by hinge providing members which resiliently hinge and which extend along opposite sides of a weighbridge pit, there being means whereby any load transmitted to one of said members is applied at a constant leverage distance from the hinge provided by said member, and there being a mechanical summation device relying on its flexure for transmitting the mean deflection of said members to the load cell; in which weighbridge there are at least two of said members on each of two opposite sides of the pit, the members being spaced apart along their respective sides of the pit, and the load-supporting structure comprises transverse beams each bridging between a pair of said members lying opposite to each other on opposite sides of said pit and the beams each abutting each of said pair through the intermediary of a constant leverage defining means.

The members are distinct from the load supporting structure and hinge along a well defined hinge axis. Unlike the flattened tube prior proposal, two members on each side are capable of independent movement in reply to the load taken by each of them. Localised loading of the platform does not matter since it is carried by the transverse beams which apply the load to constant leverage distance defining means and then through such means to the independently hingeable members. The constant leverage defining means ensure that the leverage on the members does not vary in dependence on the lateral positioning of the load on the platform and the independent movement of the members on each side ensures that the weighbridge is not sensitive to the longitudinal positioning of the load on the platform.

Embodiments of the invention will now be described, by way of example with reference to the accompanying drawings.

THE DRAWINGS

FIG. 2 is a side view seen in the direction of the arrow A of FIG. 1 of the weighbridge with its platform, FIG. 3 is an end view, part in section along line B—B of FIG. 1, of the weighbridge, and FIG. 4 is very similar to FIG. 3 but shows modifications.

Figure 1:
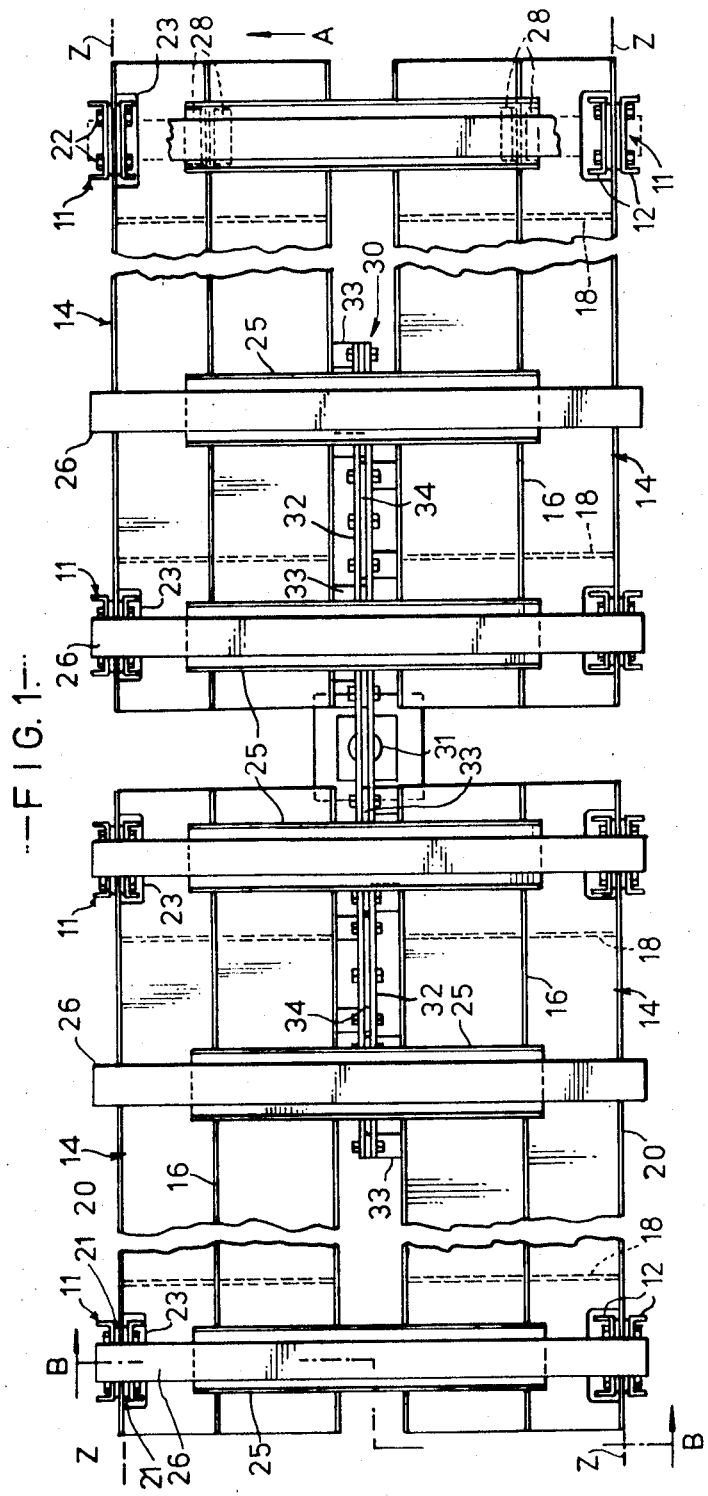
FIG. 1 is a plan view of a weighbridge without its platform.

A weighbridge pit contains eight pairs 11 of uprights 12, each of which is a U-girder with the open top of the U facing away from the open top of the other U-girder in the pair and facing transversely of the pit. These pairs 11 are spaced along both long sides of the pit and their lower ends are firmly mounted from the floor of the pit as for example by being embedded in the concrete forming that floor.

In each corner of the pit, a rigid box-section member 14 extends longitudinally of the pit. As can be seen in FIG. 3, each member consists of a trough 15 divided by a longitudinal plate 16. Transverse bulkheads 18(FIGS. 1 and 2) and cover plates 19 stiffen the member 14 further. The outer (pit-side) longitudinal face 20 of each member is clamped near each of its ends between pads 21 on the confronting faces of the uprights 12 by means of bolts or like fasteners 22 of which a preferred form will be described hereinafter with reference to FIG. 4 and which all lie in a single horizontal plane.

It is of course necessary to provide a cut-out 23 in the cover plate and the bottom plate of the member to allow the passage of the inner upright of each pair 11. Other cutouts can be provided to facilitate welding or other assembly operations or for any further reason.

The longitudinal plates 16 stand proud of the rest of the members and serve as constant leverage distance defining means. Any load transmitted to the members is through these plates and the constant leverage distance is that between these plates and the faces 20.

Straddling between a pair of members on opposite sides of the pit are a plurality of U-section girders 25 which in turn support the locate I-section beams 26. Between the beams and the girders are disposed shock-absorbing fibre pads 27. The girders terminate in the locality of the plates 16 but the beams extend across the pit and carry a load platform 29 such as a steel chequer plate or concrete raft. The load-supporting structure comprising the platform, the beams, the girders, and the pads ensure that load is only transferred to the members through the plates 16 in a vertical direction. Thus the members will be subject to a constant leverage irrespective of the transverse positioning of the load on the platform. Each member can be made sufficiently rigid in torsion, bending and shear for the only way for any substantial deflection to occur is by localised deflection of the faces 20 and the member will hinge about a well defined axis Z extending longitudinally of the face 20 and will have little other freedom.

The members are supported so that the leverage of all the members is transmitted to a load cell 31, such as a strain guage which has a deflection of say less than 00.005 inch. This is done by a mechanical summation device relying on flexure and attached to all of the members.

The summation device comprises two girder elements 32 extending slightly spaced apart along the centre line of the pit. Each girder element supports the two members neighbouring it by vertical straps attached to one by means of a single elongate bracket element 34 and to the other by means of two bracket elements 33 disposed one on each longitudinal side of the element 34 at that end of the pit. It is preferred that the bracket elements are rigid and secured to the members 14 towards the bottom of those members and to the girder elements 32 as near as possible to the centre line of the weighbridge and at the same height as the fasteners 22. The securing can be by welding, bolts, rivetting or any other means of securement. The girder elements are waisted at their centres above the load cell 31 and their weight is supported by the load cell at this point.

The members 14 are supported by the load cell 31 through the girder elements 32 and the vertical strips connecting the girder elements to the bracket elements 33 and 34.

The construction of the members 14 is such as to give a very high torsional rigidity. In the weighbridge, there is no need for any deflection in excess of 0.100 inch; thus knife edge pivots or any other form of pivots can be dispensed with since there is adequate controlled flexure to provide all the movement needed.

FIG. 4 basically illustrates the ease with which the weighbridge can be provided with adjustment means.

FIG. 4 also shows a modification to the basic structure illustrated in FIGS. 1 to 3. As can more clearly be seen in FIGS. 2 and 3, in the above embodiment the girders 25 merely rested on brackets 28 attached to the plate 16. In FIG. 4, the girders are attached to the plates 16 as will hereinafter be explained.

Basically, however, FIG. 4 illustrates the adjustment of the weighbridge. Each top-plate 19 has welded or otherwise attached to it threaded rods 51, 53, and 56 to serve as adjustment devices. There is at least one rod 51 extending across each cut-out 23 to serve with nuts 52 as a fastener 22 securing the faces 20 to the rigid mounting uprights 12. By loosening one of, and tightening the other of, the nuts 52 on one of the rods 51, an adjustment can be made which will alter the distance between the respective plate 16 and the side face 20 to correct any small errors arising in lever length. This mode of adjustment can be used to counteract a any error arising from torsion or twist of the member 14 about its longitudinal axis. It is also desirable to have similar rods 53 attaching the girder elements to the bracket elements 33 and 34. These rods are adjustable by means of nuts 54. It is to be pointed out that the rods 53 in FIG. 4 are not co-axial and one of the nuts 54 on each rod is omitted because of the section line change.

There is a cut-out 55 in the respective top plate 19 where the girders 25 are supported by the plate 16. One or more rods 56, each with two nuts 57, extends or extend across each cut-out 55 to join the plate 16 to the plate 19. Adjustment of these rods can counteract any error due to sagging of the ends or middle of the members 14.

The bolts 61 are also used to loosely secure the beams 26 to the plate 16. The bolts 61 having surrounding sleeves 62 which pass through the webs of the beams with clearance and co-operate with pressure plates 63 to clamp the beams to the brackets 28 through the intermediary of the fibre pads which are disposed on each face of the webs. The sleeves 62 prevent over-tightening of the bolts 61 so that the freedom of the beams is not interfered with to such an extent that they are capable of applying a non-vertical force or a couple to the plates 16.

In FIG. 4, only one end of each of the rods 51, 53, and 56 is shown as attached to the respective top-plate 19 but with suitable manufacturing techniques it would be possible to have the rods attached at both ends.

The members 14 are conveniently made as illustrated with the cover plate 19 of shallow trough-like form fitting into the trough 15 although it is of course necessary that each cover plate is in parts to fit on each side of the respective plate 16.

I claim:

1. A weighbridge using a single load cell with a load supporting structure which in turn is supported by hinge-providing members which resiliently hinge and which extend along opposite sides of a weighbridge pit, there being means whereby any load transmitted to one of said members is applied at a constant leverage distance from the hinge provided by said member, and there being a mechanical summation device relying on its flexure for transmitting the mean deflection of said members to the load cell; in which weighbridge there are at least two of said members on each of two opposite sides of the pit, and the load supporting structure comprises transverse beams each bridging between a pair of said members lying opposite to each other on opposite sides of said pit and the beams each abutting each of said pair through the intermediary of a constant leverage defining means.

2. A weighbridge according to claim 1, in which the said summation device comprises two girder elements which extend substantially along the longitudinal centre line of the weighbridge and each of which is attached to both of the members on one of said opposite dies.

3. A weighbridge according to claim 1, in which the constant leverage defining means for each said member is a plate upstanding from and integral with the member.

4. A weighbridge according to claim 1 in which the beams are located in U-section cross girders and are separated therefrom by shock-absorbing pads and wherein the load is transmitted from the beams through said shock-absorbing pads, the cross girders, brackets attached to the constant leverage defining means, and said constant leverage defining means to the members.

5. A weighbridge according to claim 1, wherein said members are hollow, and are attached to mounting means therefor on only one face of each of said members whereby the hinging action occurs by flexure of that face.

6. A weighbridge according to claim 5, wherein said members are box-girders stiffened by transverse bulkheads.

7. A weighbridge according to claim 5, wherein said only one face of each member is vertical and is the outermost face of the respective member.

8. A weighbridge according to claim 2 further characterised by the fact that there is associated with each said member at least one adjustment device located in a position selected from the following group:
  a. where the member is clamped to the mounting means therefor,
  b. where the member is joined to the summation device,
  c. in a position such as to adjust the transmission of the load to said constant leverage defining means.

9. A weighbridge according to claim 8 in which the adjustment device or each adjustment device comprises a threaded rod with nuts thereon.

* * * * *